US005689932A

United States Patent [19]

Peronek et al.

[11] Patent Number: 5,689,932
[45] Date of Patent: Nov. 25, 1997

[54] QUICK CHANGE METHOD AND APPARATUS FOR FILLING AND CAPPING MACHINES

[75] Inventors: Michael H. Peronek, Strongsville; Daniel L. Goodell, Tallmadge, both of Ohio

[73] Assignee: FCI, Inc., Cleveland, Ohio

[21] Appl. No.: 645,556

[22] Filed: May 13, 1996

[51] Int. Cl.[6] ............................ B65B 59/04; B65B 7/28
[52] U.S. Cl. ........................... 53/201; 53/253; 53/300; 53/471
[58] Field of Search ........................ 53/253, 249, 201, 53/300, 471, 283, 282, 272, 273

[56] References Cited

U.S. PATENT DOCUMENTS

| | | | |
|---|---|---|---|
| 3,587,829 | 6/1971 | Sorensen | 53/300 X |
| 4,099,361 | 7/1978 | Dix et al. | 53/201 X |
| 5,347,788 | 9/1994 | Petz et al. | 53/201 X |
| 5,581,975 | 12/1996 | Trebbi et al. | 53/282 X |

*Primary Examiner*—James F. Coan
*Attorney, Agent, or Firm*—Vickers, Daniels & Young

[57] ABSTRACT

A bottling machine for filling or capping containers having a generally circular cross section is provided. The bottling machine includes a rotatable star wheel having a plurality of peripheral individual removable neck support assemblies for receiving and moving the containers through the machine. Each of the individual neck support assemblies includes a pocket support for holding the containers and a snap locking mechanism including a piston on the neck support assembly cooperable with a clamp pin on the star wheel for releasably attaching each of the neck support assemblies to the star wheel.

36 Claims, 7 Drawing Sheets

QUICK CHANGE METHOD AND APPARATUS FOR FILLING AND CAPPING MACHINES

The present invention relates to generally to an apparatus for use in the bottling industry for filling or capping containers and more particularly to an improvement for use in filling or capping machines which allows quick change over of the machine to allow different size bottles to be run on the same machine.

The invention is particularly applicable to the connection assembly which is placed on a rotatable hub of the machine for supporting a bottle and will be described with particular reference thereto. However, the invention has broader applications and can be applied to capping or filling machines which are designed to accommodate various bottle sizes.

BACKGROUND OF THE INVENTION

Bottling machines, which are defined herein so as to include both machines for filling containers or capping containers after being filled are well known in the prior art. Reference may be had to U.S. Pat. Nos. 4,624,098 and 4,295,320, incorporated by reference herein, for a description of conventional type capping machines. Such machines will not be described in detail in this specification.

Generally, a capping machine or conventional capping apparatus includes a rotatable star wheel mechanism having a plurality of neck support assemblies arranged about the periphery of the star wheel. An end feed mechanism or conveyor is utilized to bring bottles to an entry point at the capper star wheel and an out feed mechanism or conveyor is similarly mated to the rotatable star mechanism to transfer the capped (or filled) bottles from an exit point at the capper star wheel. A stationary rear guide extending generally between the entry and exit point is spaced radially outwardly from the neck support assembly on the rotatable star wheel. This rear guide functions to retain the bottles in the individual pockets of the neck support assembly as the star wheel rotates. In a conventional capping apparatus a turret capper head is directly over the capper star wheel and moves in synchronous rotation with the capper star wheel. The capper head is driven axially downward at predetermined periods of time to place a tightened cap onto the bottle neck.

A single capping or filling machine is used to fill or cap many different size bottles. In the soft drink industry, such size bottles,can include a 12 oz, a 20 oz, a one liter bottle or others. Typically, positive control of the bottles throughout the machine is gained by holding the bottles by the neck. Thus, based upon a predetermined control height, all bottles will be suspended throughout the filling or capping process by the bottle neck ring. The control height is determined by the tallest bottle to be filled. This height is then constant for all other size bottles to be run on the same machine. Normally, the bottle will be suspended about ¼ inch above the normal wear surface. Mounted on the basic shaft of the bottling machine is a hub which supports a mounting plate and star wheel thereon. As the shaft is rotated, the hub rotates the star wheel, thus moving bottles through the machine to accomplish the capping or filling process. Smaller star wheels include a neck support assemblies integral with the hub. Larger star wheel assemblies include neck guide assemblies mounted on the star wheel. Each neck guide assembly has fingers extending therefrom and supports the neck of the bottle. In order to retain the control height constant for different size bottles, each bottle requires a different size and/or shape neck support bracket. Thus, in each instance where the bottle size to be run is changed, it is necessary to change over different aspects of the bottling machine including the neck support bracket. Such change is usually made by changing the entire star wheel and hub as described later.

The larger star wheel assembly typically has nineteen neck support sections. Each one of these is individually bolted onto the star wheel at four or five locations. Each one of the bolts pass through the neck support and is threaded into the star wheel. These threaded connections typically require a torque wrench or other tool for tightening. In a bottling plant, such a change over requires the use of skilled labor. Typically, thousands of bottles pass through the bottling machine each hour. Maintaining this volume is very important to meet both consumer and industry demands. As such, the down time associated with a change over to different size bottles cost thousands of dollars in lost productivity due to reduced output capacity, idle manpower and the skilled work force required to complete a change over. The use of common fasteners such as bolts also adds to the number of spare parts which must be inventoried and readily available should others become lost or broken. Further, care must be taken during change over to insure that all bolts are fastened tightly. Failure to do so may result in bolts coming loose and causing damage to a machine or shutting down an entire line within a bottling plant.

In an effort to reduce the time required for change over, hub and star wheel assemblies can be pre-assembled with different neck support assemblies for each size bottle. At the time of change-over, the entire hub and star wheel is removed and replaced with a different pre-assembled hub and star wheel. However, the removal of these hubs and star wheels is also problematic. The weight of the hubs requires that they be assembled in two halves. Two people are generally required to lift and install. Additionally, as in a capping machine, clearance below the capper head makes installation especially difficult. Finally, after installation, fine tune adjusting and retiming is required to insure that neck support assemblies coincide and are synchronous with infeed and outfield conveyor systems as well as the caper head in the case of a capping machine or a filling head in the case of a filling machine.

SUMMARY OF THE INVENTION

The present invention advantageously provides an improved connection mechanism to the star wheel which overcomes the disadvantages of prior art connection arrangements. In this respect the neck support assembly has been designed for quick removal of each individual neck support assembly at a station on the star wheel without removing the star wheel or hub. Different neck support assemblies for each size bottle to be utilized are provided and easily installed onto the star wheel. A hold down button is used to release the support from the star wheel or hub in a matter of seconds. This significantly reduces the down time due to a change over. Further, it also eliminates installing heavy hub and star wheel assemblies and the adjusting and retiming required at a change over. Therefore, no tools are needed to effect a change over and skilled labor is generally not required. A machine operator is able to depress a button, remove a single neck support assembly and replace it with another neck support assembly which is easily snapped into place. No adjusting or tools are required. This reduces the number of parts necessary to effect the change over and also provides positive mounting to the bottling machine once the initial modifications are made to the hub and star wheel. No further modifications are required to run different size bottles.

More particularly in this respect a conventional bottling machine for filling or capping containers which have a generally circular cross section is provided with a quick change connection on a neck support assembly. The bottling machine comprises a rotatable star wheel which has a plurality of peripherally spaced individual neck support assemblies. The neck support assemblies receive and move each bottle container through the machine. Each of the plurality of individual neck support assemblies includes a pocket support for holding the container and a star wheel support portion attached to the star wheel. The star wheel support portion includes a snap locking mechanism for releasably attaching each of the neck support assemblies to the star wheel.

The star wheel hub is fitted with a plurality of studs having threaded portions and shank portions. In most instances, these threaded studs may be placed in existing threaded holes in the star wheel which have already been tapped for receiving the bolts to attach the prior art neck support assemblies. The star wheel is also fitted with a hub clamp pin having a threaded portion placed in the star wheel and a shank portion extending upwardly therefrom. The shank portion includes a concave portion around the circumference of the shank. The neck support assembly includes mating holes which are placed over the studs and the clamp pin. The neck support is thus in its final position on the star wheel and is aligned to receive bottles. The neck support assembly also includes a hole within which a spring loaded piston is located. The spring loaded piston has an extended (locked) position and a depressed (unlocked) position. The hole for the spring loaded piston and the opening for the clamp pin intersect within the neck support assembly. Specifically, the concave portion of the clamp pin intersects with the spring loaded piston. In the depressed position, the piston is capable of sliding over the hub clamp pin. When the piston is released in an extended position, the piston engages with the concave portion of the hub clamp pin to form an interference fit preventing further movement of the neck support assembly. During change over, the individual neck support assemblies may be removed from the star wheel by simply depressing that portion of the piston extending from the neck support assembly. This disengages the spring loaded piston from the concave portion of the hub clamp pin, whereby the neck support assembly is easily lifted off the star wheel hub.

It is thus, an outstanding object of the present invention to provide an improved connection mechanism for a bottling machine.

It is yet another object of the present invention to provide an improved connection mechanism for a bottling machine which does not require tools for installation or removal.

Still another object of the present invention is to provide an improved bottling machine which utilizes neck support assemblies which can be positively mounted to the machine without the use of tools.

Yet another object of the present invention is to provide an improved bottling machine which reduces the idle time required for a change over of equipment.

Yet still another object of the present invention is to provide an improved bottling machine which eliminates the need for adjusting and retiming of the bottling line after equipment change over.

Still another object of the present invention is to provide an improved method of changing over a bottling line to accommodate different sized bottles.

It is still yet another object of the invention to provide a neck support assembly which is easily attached and removed to existing bottling equipment without significant modification to existing equipment.

It is yet another object of the present invention to reduce the cost associated with a change over of equipment in the bottling industry.

These and other objects of the invention will become apparent to those skilled in the art upon reading and understanding the following detailed description of the preferred embodiment.

BRIEF DESCRIPTION OF THE DRAWINGS

The invention may take physical form in certain parts and arrangements of parts, the preferred embodiment of which will be described in detail and illustrated in the accompanying drawings to form a part hereof and wherein.

DESCRIPTION OF THE PREFERRED EMBODIMENT

Figure 1:
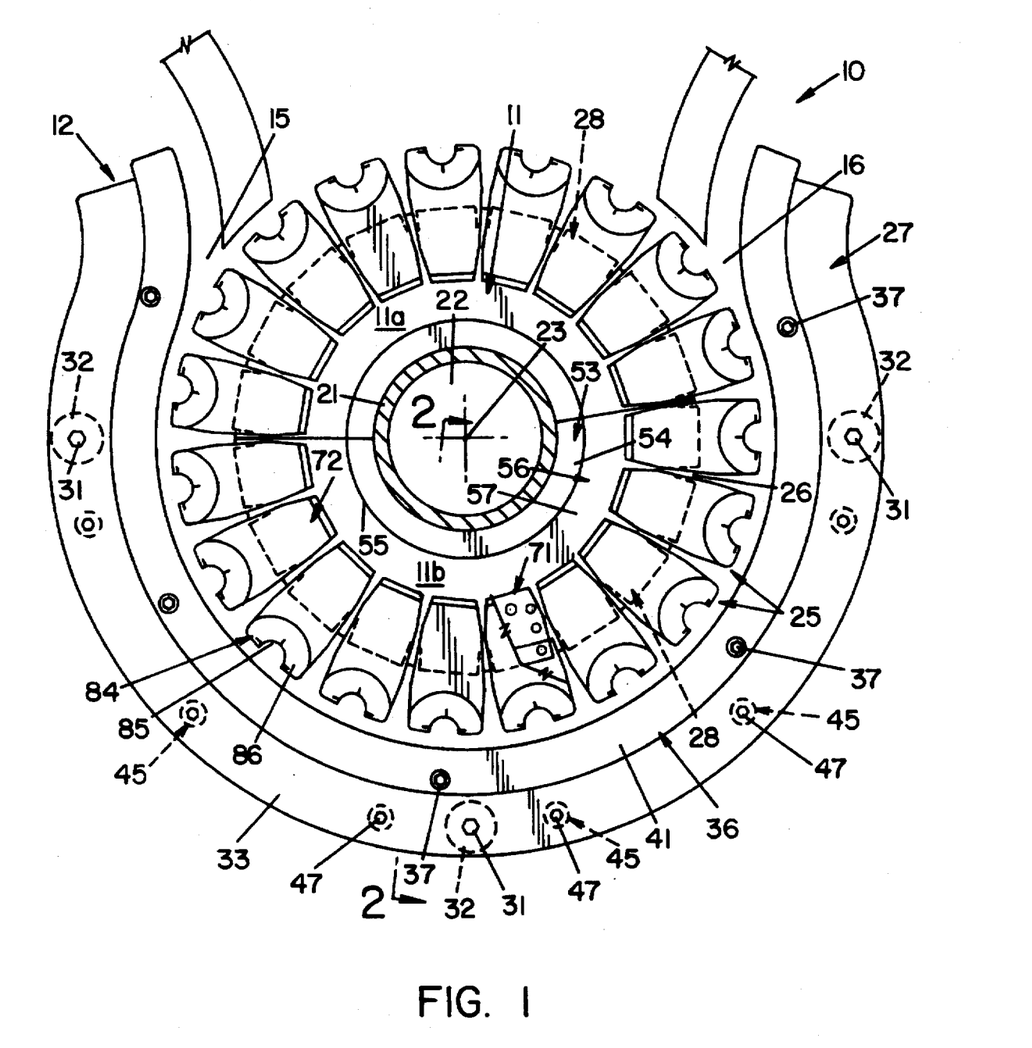
FIG. 1 is a plan view of a bottling machine employing the neck support assemblies of the present invention.
Figure 2:
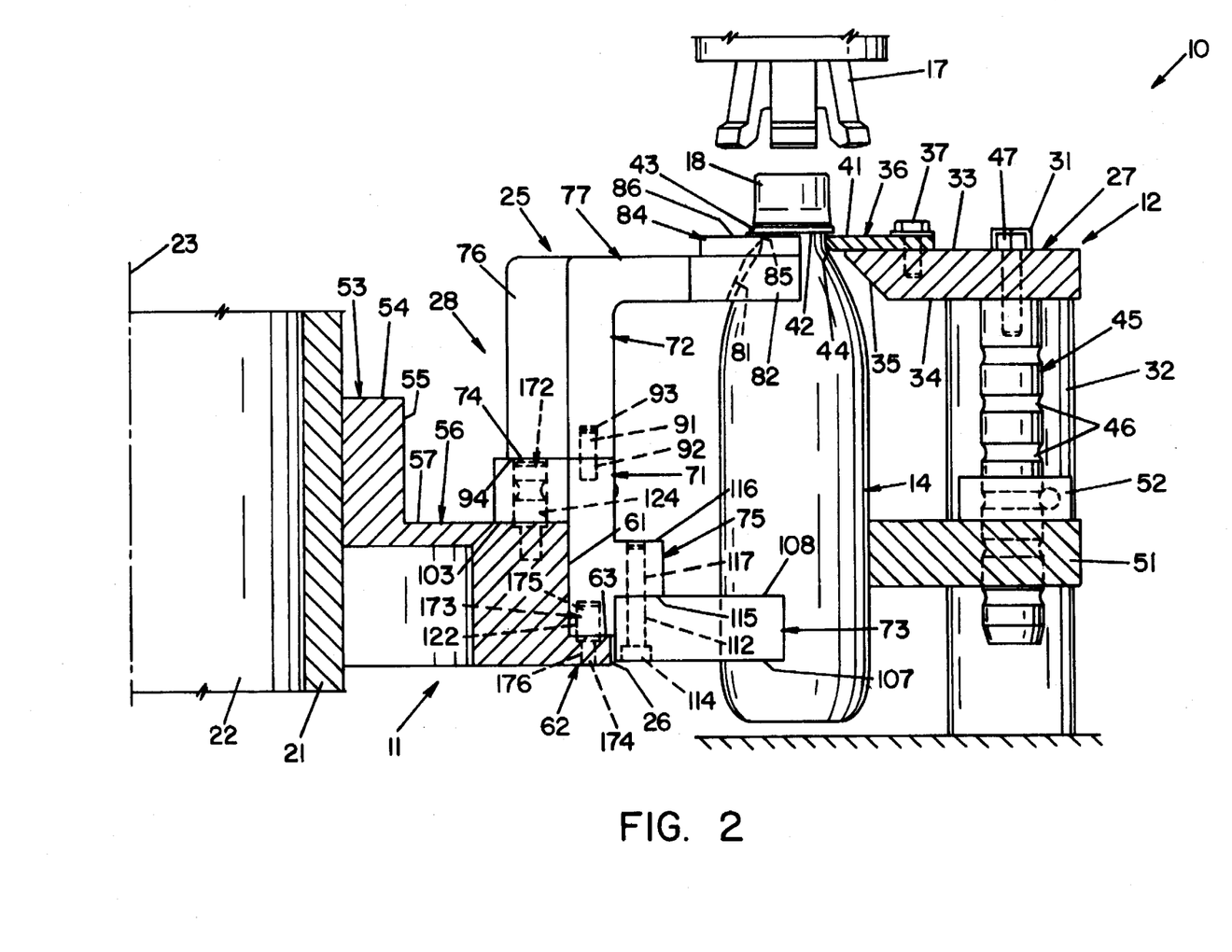
FIG. 2 is a cross sectional elevation view taken along line 2—2 of FIG. 1.
Figure 3:
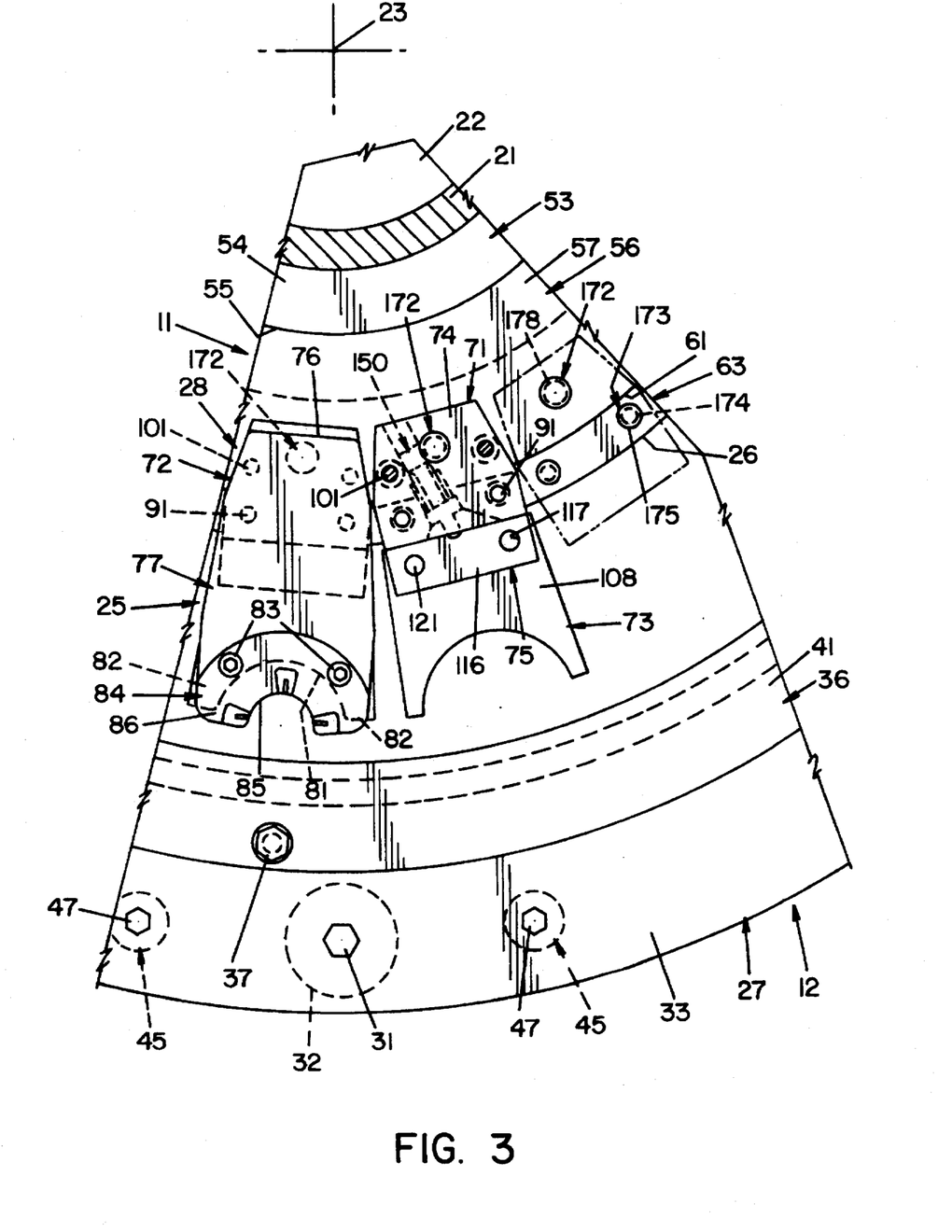
FIG. 3 is a partial plan view of the star wheel of FIG. 1 showing various details of the neck support assembly of the present invention.

Referring now to the drawings wherein the showings are for the purpose of illustrating the preferred embodiment of the invention only and not for the purpose of limiting same, FIGS. 1–3 show various portions of what is defined as a bottling machine 10. As noted in the background portion of this specification, bottling machine as defined herein includes both filling and capping bottling equipment; filling equipment being that which fills the bottle with product, such as a soft drink, and capping equipment being that which applies a cap, crown or other closure to the bottle. As is also noted in the background section reference may be had to U.S. Pat. No. 4,624,098 to Trendel and U.S. Pat. No. 4,295,320 to Willingham, incorporated by reference herein, for a more detailed explanation of a capping machine.

The bottling machine 10 shown includes a rotatable star wheel 11 and a fixed rear guide 12 spaced radially outwardly from rotatable star wheel 11 for retaining the bottles 14 within rotatable star wheel 11. Rotatable star wheel 11 and fixed rear guide 12 are conventional. Depending upon the application of bottling machine 10 an additional star wheel (not shown) or conveyor (not shown) is mated to rotatable star wheel 11 at a fixed entry point 15 on rotatable star wheel 11. Bottles 14 are rotated out of rotatable star wheel 11 at a fixed exit point 16 to an out feed star wheel (not shown) or conveyor (not shown) leading to further processing or handling equipment. The embodiment of FIG. 2 shows a capping machine having a capper head 17 is for placing a closure 18 on bottle 14. Rotatable star wheel 11 essentially comprises a hub 21 secured to a vertically extending drive shaft 22 which rotates about a drive shaft axis 23.

Extending radially outwardly from hub 21 are a plurality of neck support assemblies 25. As shown, each of neck support assemblies 25 is mounted on star wheel 11 at a neck support station 28. As seen in FIG. 1, star wheel 11 shows nineteen individual neck support assemblies 25 at nineteen neck support stations 28. Each of the neck support assemblies 25 is arranged about the periphery 26 of rotatable star wheel 11, which is generally circular. Each neck support assembly 25 is easily removable from rotatable star wheel 11 as will be described later in the specification.

Fixed rear guide 12 includes an annular rear neck guide 27 secured in a stationary manner by the hex head cap screws 31 to a frame member 32. Rear neck guide 27 has a top surface 33, a bottom surface 34 and an inclined edge surface 35 which extends radially outwardly from top surface 33 to bottom surface 34. An annular neck block 36 is secured by hex the head fasteners 37 to top surface 33 of rear neck guide 27. Neck block 36 has a top surface 41 which, as shown in FIG. 2, is adapted to be in contact with the underside 42 of a flange 43 of bottle 14. Neck block 36 also includes an inclined edge surface 44 extending radially outward from top surface 41. Fixed rear guide 12 and specifically annular neck block 36 functions to support flange 43 and bottle 14 by retaining bottle 14 on rotatable star wheel 11. The details of fixed rear guide 12 can generally be found in the prior art.

Suspended from rear neck guide 27 are the vertical stainless steel posts 45 having the concave grooves 46 spaced at equal increments along its length. Vertical stainless steel posts 45 are attached to rear neck guide 27 by the hex head cap screws 47 which pass through rear neck guide 27 and into stainless steel posts 45. An annular side wall rear guide 51 is attached to stainless steel posts 45 by the adjusting blocks 52. Each of adjusting blocks 52 is adjustable between adjacent concave grooves 46 in order that. Sidewall rear guide 51 may be placed in optimum position to contact the side wall of bottle 14. Sidewall rear guide 51 functions to maintain bottles 14 in position while star wheel 11 rotates bottles 14 from entry point 15 to exit point 16.

Star wheel 11 extends radially outwardly from hub 21 and has an annular neck portion 53 secured at its inner end to hub 21. Specifically, a neck portion top surface 54 extends radially outwardly to a neck portion edge surface 55 which is generally coaxial with drive shaft axis 23. Neck portion edge surface 55 terminates at a support plate portion 56 having a support plate top surface 57 which also extends radially outward from hub 21 and is generally parallel to top surface 54. A top surface 57 extends radially outwardly to a support plate edge surface 61 which then extends downwardly to a ledge plate portion 62 having a ledge plate top surface 63 parallel to both of top surfaces 54 and 57. Top surface 63 extends radially outwardly to periphery 26 of star wheel 11.

As shown, star wheel 11 is used on large capacity bottling machines. This means that periphery 26 is circular and shaft 22 is fitted with a single hub 21 and star wheel 11 used with all sizes of bottles. Neck support assemblies 25 for each size bottle are provided and are easily installed and removable as will be described hereinafter. It will be appreciated that for smaller capacity machines or for different applications within the same conveyor line, a star wheel may instead comprise a hub and star wheel portion having individual pockets within the hub itself that serves a function similar to neck support assembly 25. In such an instance, which does not form a part of this invention, individual hubs are designed and removable when it is desired to convert a line to different size bottles. It will be appreciated that in this instance, star wheel 11 is split-into two halves 11a and 11b to permit installation and repair without disturbing, for instance, capper head 17 shown schematically at FIG. 2 and further to allow ease of assembly and disassembly by reducing the weight of individual pieces.

Neck support assemblies 25 comprise three distinct pieces including a neck support bracket 71, a neck guide 72 and a bottom body guide 73. Neck support bracket 71 is attached to star wheel 11 with neck guide 72 attached to the top surface 74 of neck support bracket 71 and bottom body guide 73 attached to guide support 75 of neck support bracket 71.

Neck guide 72 includes a vertical standard 76 extending upwardly from top surface 74 and a guide bracket 77 extending perpendicular from vertical standard 76 radially outwardly and ending at a neck pocket 81 formed by the opposite extending fingers 82 extending from guide bracket portion 77. Each retaining pocket 81 is generally semi-circular in configuration and encompasses an included angle of approximately 180 degrees between adjacent fingers 82. Secured by means of the fasteners 83 to each underlying retaining pocket 81 is a replaceable neck pocket insert 84. Neck pocket insert 84 includes a neck pocket 85 having a semi circular cross section and encompassing an included angle of approximately 180 degrees. Bottle neck flange 43 rests on the top surface 86 of neck pocket insert 84 at an area diametrically opposed to contact established by neck block top surface 41 which coact and function to maintain bottle 14 within neck pocket 85 as star wheel 11 rotates. Neck pocket insert 84 prevents rotation of bottle 14 when a closure 18 is tightened thereon by capper head 17.

Figure 6:
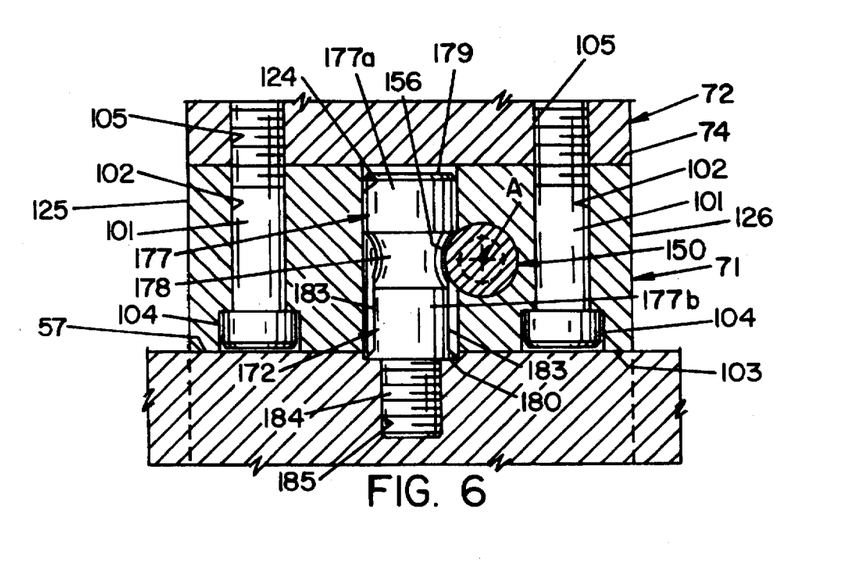
FIG. 6 is a cross sectional elevation view taken along line 6—6 of FIG. 4A; and, FIG. 7 is an exploded view showing the details of the snap lock mechanism in accordance with the present invention.

Neck guide 72 is aligned with neck support bracket 71 by the pins 91 which are placed into the bores 92 in top surface 74 of neck support bracket 71. The bores 93 are placed in the bottom surface 94 of vertical standard 76 and aligned in substantial registry with bores 92 in order that pins 91 align neck guide 72 with neck support bracket 71. The hex head cap screws 101 rigidly join neck support bracket 71 to neck guide 72. Cap screw holes 102 are reamed through neck support bracket 71 between a support plate surface 103 and top surface 74. Adjacent support plate surface 103 each of cap screw holes 102 includes counter bore portions 104 extending from support plates surface 103 between ¼ and ½ inch. As shown in FIG. 6, the two threaded holes 105 are tapped within neck guide 72 and specifically bottom surface 94 of neck guide 72. Thus, prior to assembly of neck support assembly 75 onto star wheel 11, hex head cap screws 101 are inserted within cap screw holes 102 and screwed into threaded holes 105 with pins 91 aligning neck support bracket 71 and neck guide 72 in order that a rigid connection is formed.

Figure 5:
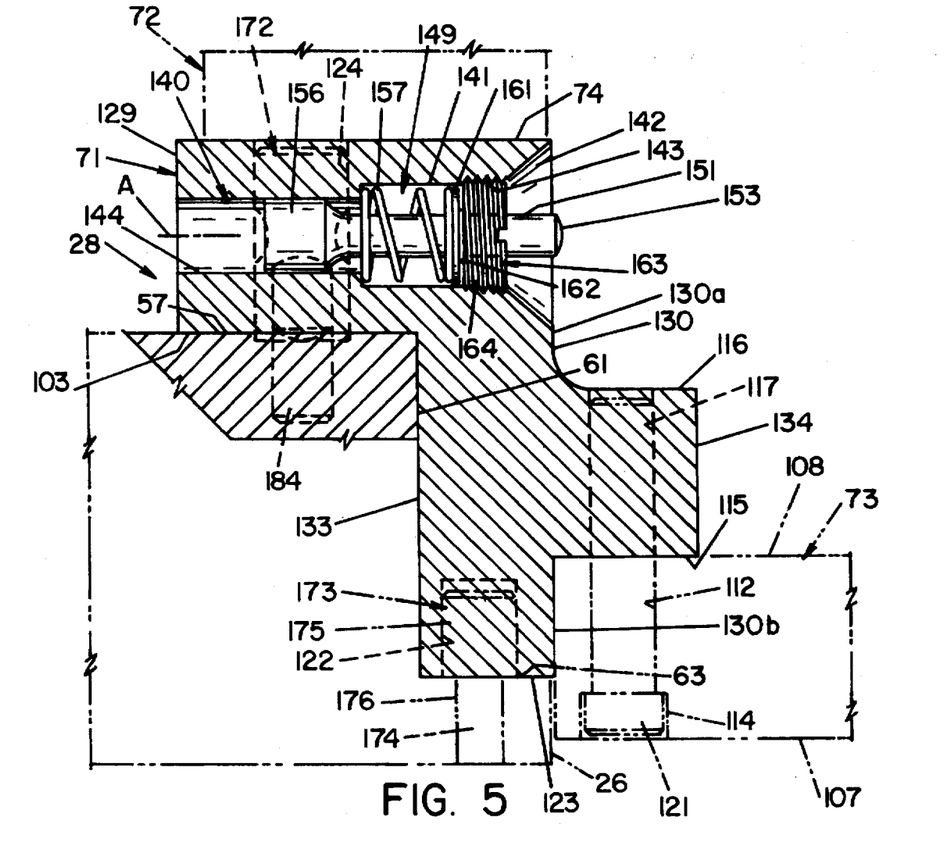
FIG. 5 is a cross sectional elevation view taken along line 5—5 of FIG. 4A.

As shown, in FIGS. 2 and 5, bottom body guide 73 includes a body guide bottom surface 107 and a body guide upper surface 108. The two body guide holes 112 (only one shown) are reamed between body guide bottom surface 107 and body guide upper surface 108. A counter bore 114 is also placed coaxial with body guide holes 112 adjacent body guide bottom surface 107. Guide support 75 of neck support bracket 71, having a guide support lower surface 115 and a guide support upper surface 116 has the two guide support holes 117 tapped between guide support lower surface 115 and guide support upper surface 116. When guide support holes 117 are aligned with body guide holes 112, the cap screws 121 are placed through holes 112 and threaded into guide support holes 117 to rigidly attach bottom body guide 73 to neck support bracket 71. It will be appreciated that each of bottom body guides 73 can have a retaining pocket (not shown) similar in cross section to retaining pocket 81.

As such, bottom body guide 73 contacts the sidewall of bottle 14 at an area diametrically opposed to the sidewall contact established by annular sidewall rear guide 51 to retain bottle 14 substantially vertical while star wheel 11 rotates bottles 14 from entry point 15 to exit point 16.

As best seen in FIGS. 5 and 6, neck support bracket 71 includes the two ledge plate or mating holes 122 bored approximately ½ inch into the lower ledge surface 123 of neck support bracket 71. In addition, a clamp pin opening or hole 124, approximately ½ inch in diameter, is placed within neck support bracket 71 between top surface 74 and support plate surface 103. Spanning between guide support lower surface 115 and guide support upper surface 116 as well as between lower ledge surface 123 and a portion of top surface 74 are the support bracket side surfaces 125 and 126. Support bracket side surfaces 125 and 126 are parallel. Extending radially inwardly from support bracket side surfaces 125 and 126 and spanning between support plate surface 103 and a portion of top surface 74 are the angled bracket side surfaces 127 and 128. Each of angled bracket side surfaces 127 and 128 deviate from the parallel bracket side surface 125 and 126 by 15 degrees respectively. Each of angled bracket side surfaces 127 and 128 terminate at a radially inwardly facing rear surface 129. Opposite radially facing rear surface 129 is a radially outwardly facing front surface 130, which is parallel to rear surface 129. As shown, front surface 130 includes an upper portion 130a and a lower portion 130b. Opposite support plate edge surface 61 is an inward support surface 133 of neck support bracket 71. Opposite thereof, is front guide support surface 134, which is the most radially outward facing surface of neck support bracket 71. It will be appreciated that neck support bracket 71 is shown in a preferred embodiment for a 20 oz plastic bottle. As the bottle size changes, guide support 75 may be positioned at a different point vertically along radially outward facing front surface 130. For instance, neck support bracket 71 may be modified for a 1 liter bottle by constructing bracket 71 so that guide support 75 is in a position vertically downward from the position shown to extend from lower portion 130b of outwardly facing front surface 130. Thus, upper portion 130a of surface 130 would be longer than is shown in FIG. 5. It is also contemplated that to accommodate a 12 oz bottle, guide support 75 may be enlarged so that upper portion 130a of surface 130 appears substantially as seen in FIG. 5 while lower ledge surface 123 and guide support lower surface 115 become coplanar and substantially eliminate lower portion 130b of surface 130.

Figure 4A:
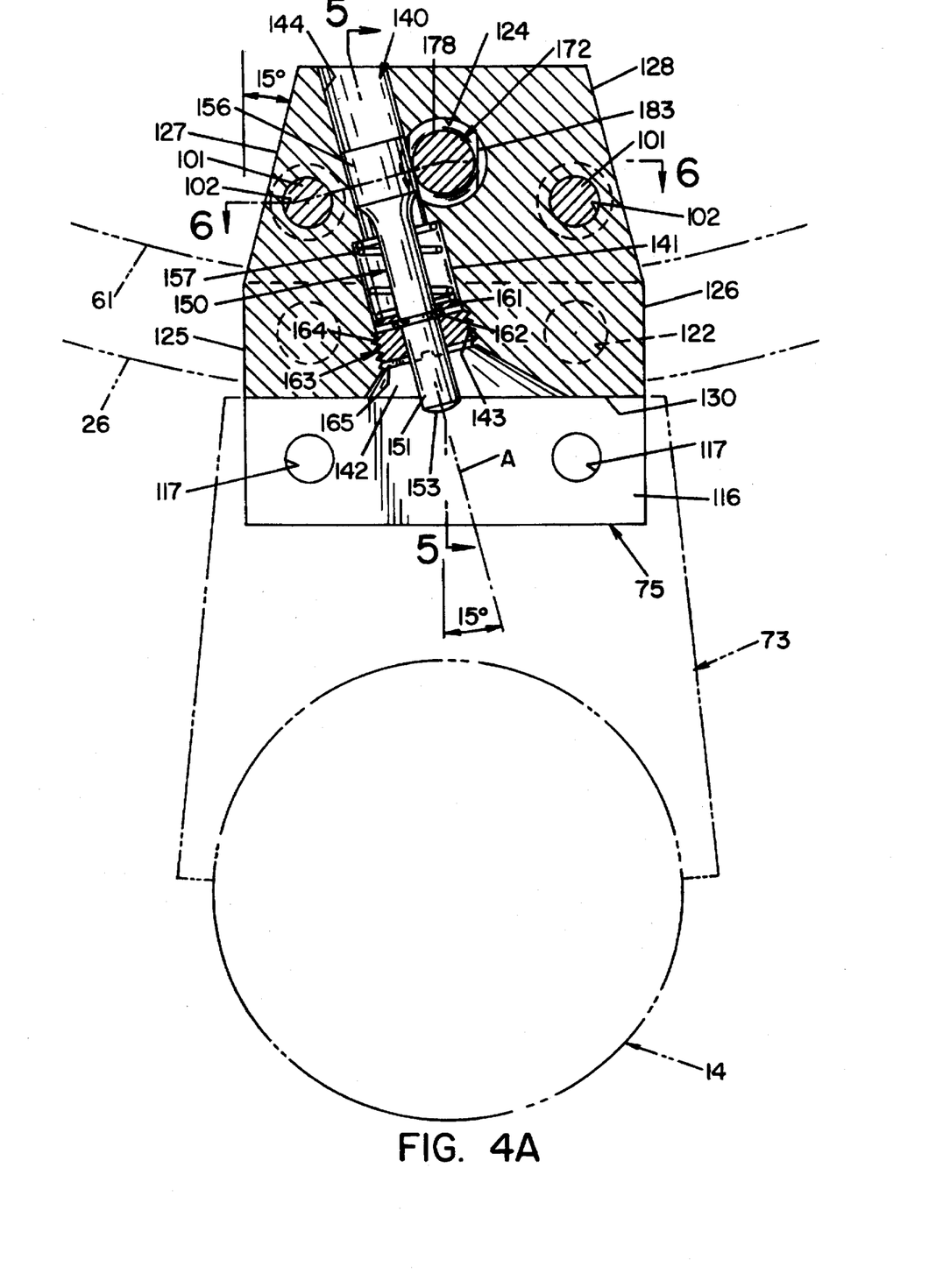
FIG. 4A is a cross sectional plan view of a neck support assembly of the present invention in a locked position.
Figure 4B:
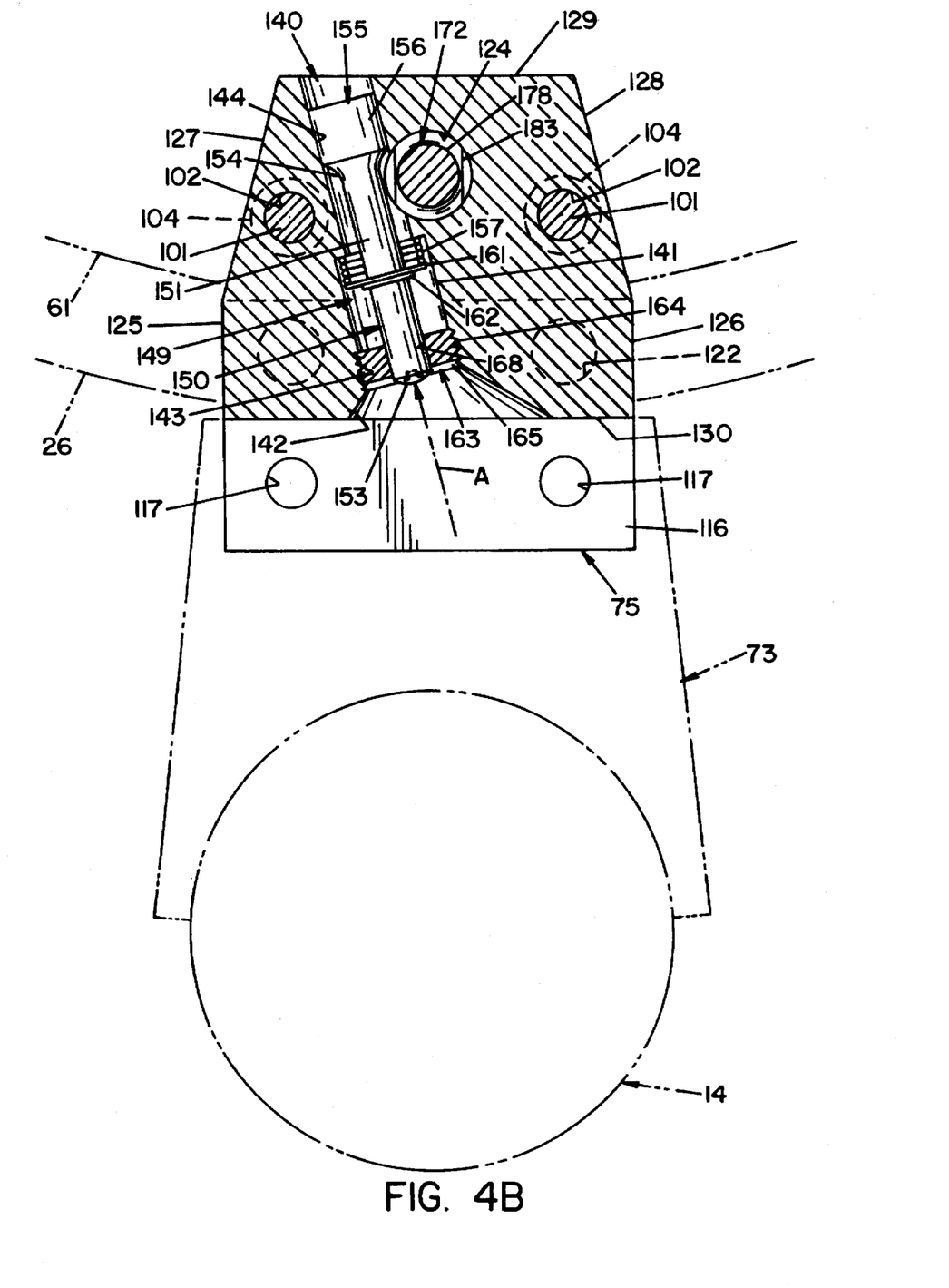
FIG. 4B is a cross sectional plan view of a neck support assembly of the present invention in an unlocked position.

A piston hole 140 is reamed through neck support brackets 71 between upper portion 130a of surface 130 and inwardly facing rear surface 129. As can be seen in FIGS. 4A and 4B, hole 140 is reamed at an angle of approximately 15° from surfaces 125 and 126. As such, axis A of piston hole 140 is approximately parallel to angle bracket side surface 128. Piston hole 140 includes a counter bore portion 141 extending from upper portion 130a of front surface 130. Adjacent upper portion 130a of front surface 130 is a counter sink portion 142 flared outwardly to such an extent that counter sink portion 142 resembles a frusto-conical shape. Counter bore portion 141, directly adjacent counter sink portion 142 is also provided with a tapped threaded portion 143. Piston hole 140 intersects with clamp pin hole 124 within a sleeve portion 144 for purposes which will be described hereinafter.

Figure 7:
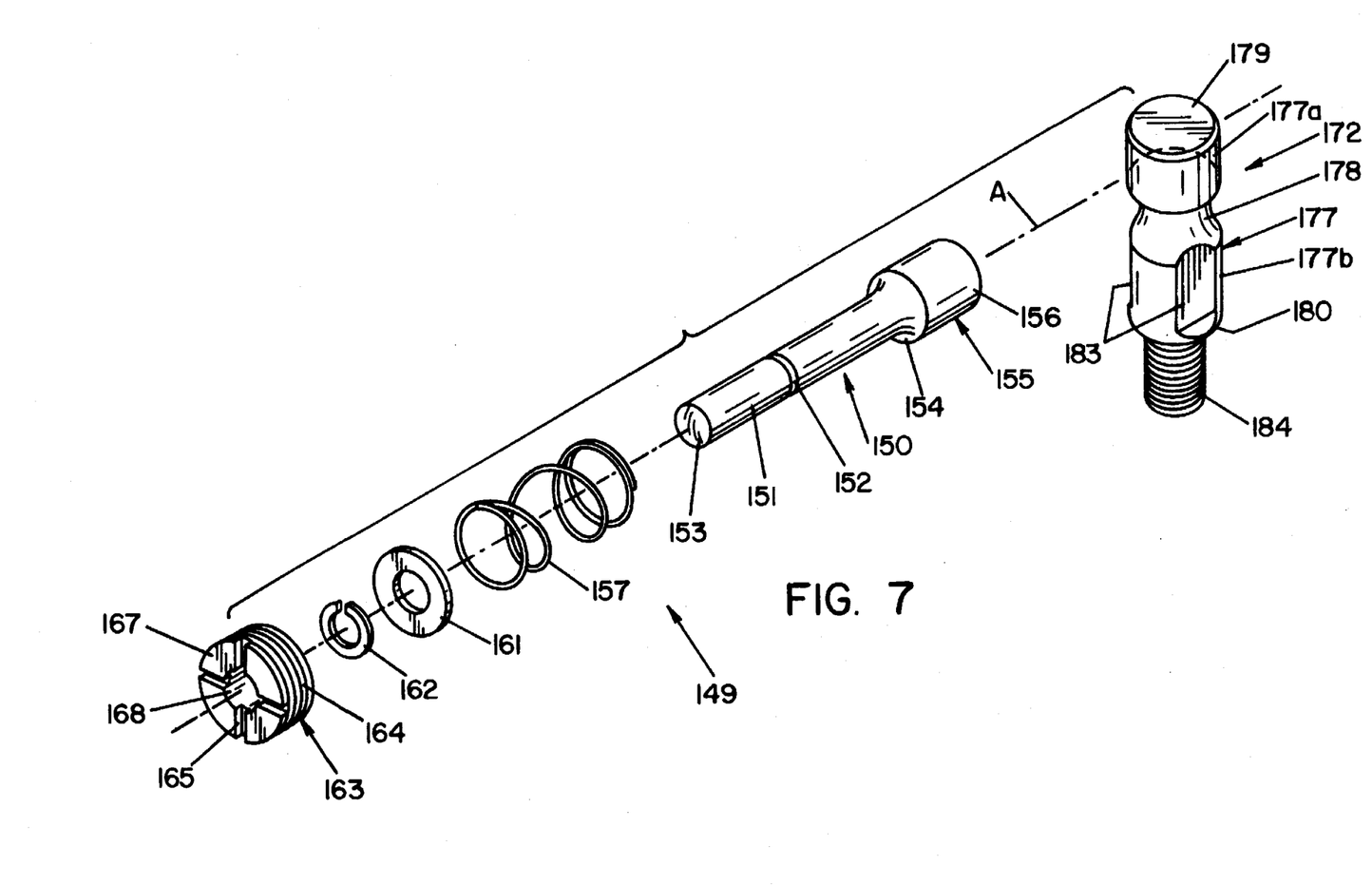

Fitted within piston hole 140 is a snap locking mechanism 149. Snap locking mechanism 149 is comprised of a piston plunger 150 having a longitudinally extending rod 151 with a circumferential groove 152 thereon. An outwardly extending end 153 of piston plunger 150 is convex. An inwardly extending end 154 flares outwardly into a clamp pin engaging portion 155 forming a cylinder end 156. Fitted over rod 151 of plunger 150 is a compression spring 157 having a diameter generally equal to that of counter bore portion 141. A washer 161 having a diameter generally equal to that of compression spring 157 and a snap ring 162 which is adapted to slide over rod 151 and snap into circumferential groove 152 where it is retained is also provided. Retaining snap locking mechanism 149 in place is a threaded brass containment insert 163 having a threaded portion 164 adapted to be threaded into tapped threaded portion 143 of piston hole 140 by using the screw driver grooves 165 on a front face 167 of containment insert 163.

Snap locking mechanism 149 is assembled within piston hole 140 by first placing piston plunger 150 within piston hole 140, with cylinder end 156 specifically placed within sleeve portion 144. Compression spring 157, having an uncompressed length generally equal to that between inwardly extending end 154 and circumferential groove 152, is placed within counter bore portion 141. Washer 161 is also placed within counter bore portion 142 to contain compression spring 157. Snap ring 162 is placed within circumferential groove 152 of rod 151 to retain washer 161 in place. Threaded containment insert 163 is then screwed into threaded portion 143 using screw driver grooves 165 and allowing outwardly extending end 153 to protrude through a containment opening 168. It will thus be appreciated that snap locking mechanism 149 is capable of moving between extended (locked) and depressed (unlocked) positions shown in FIGS. 4A and 4B, respectively along axis A. FIG. 4A shows compression spring 157 at rest while FIG. 4B shows compression spring 157 compressed at one end of counter bore portion 141 adjacent sleeve portion 144, with snap ring 162 allowing such spring 157 to be compressed.

In order to facilitate mounting of neck support bracket 171, a clamp pin 172 is provided together the with two dowels or studs 173. Each of dowels or studs 173 has a dowel threaded portion 174 and a shank portion 175. Dowel threaded portion 174 is placed within a tapped hole 176 of ledge plate top surface 63 and screwed into place wherein shank portion 175 extends above ledge plate top surface 63. Clamp pin 172 includes a pin shank portion 177 and a circumferential concave portion 178 located half way between an upper end 179 and a lower end 180 of shank portion 177, thus dividing shank portion 177 into two relatively equal halves, the upper portion being 177a and the lower portion being 177b. The lower portion 177b of shank portion 177 includes the two opposite flat portions 183 to accommodate a wrench. Clamp pin 172 also has a threaded portion 184 extending below lower end 180. Threaded portion 184 is placed within a pin tapped hole 185 which is tapped into support plate top surface 57 of support plate portion 56. Clamp pin 172 is turned into place using opposite flat portions 183.

Neck support bracket 71 is thus placed into final position on star wheel 11 by aligning clamp pin hole 124 and ledge plate or mating holes 122 with clamp pin 172 and the two dowels or studs 173, respectively. By depressing snap locking mechanism 149 in its depressed (unlocked) position, as shown in FIG. 4B, neck support bracket 71 can be placed over clamp pin 172, over dowels 173, and lowered into position on star wheel 11. Specifically, support plate surface 103 is placed into contact with support plate top surface 57 and lower ledge surface 123 is placed into contact with ledge plate top surface 63 while inward support surface 133 is placed into contact with support plate ledge surface 61.

Upon releasing outwardly extending end 153 of snap locking mechanism 149, compression spring 157 expands and causes cylinder end 156 to slide into interfering engagement with circumferential concave portion 178 of clamp pin 172 to form an interference fit. Thus in such position, neck support bracket 171 is positively locked onto rotatable star wheel 11 and cannot be lifted off without again depressing piston 150. It will be appreciated that the intersection of piston hole 140 and clamp pin hole 124 allows the snap locking to take place. In order to facilitate this locking, it will also be appreciated that circumferential concave portion 178 has a radius which is equal to or slightly greater than the radius of cylinder end 156 in order that the cylinder end 156 fits within concave portion 178. Further, as shown, clamp pin hole 124 is generally perpendicular to piston hole 140 but the intersection of holes 124 and 140 is an offset intersection as best seen in FIGS. 4A, 4B AND 6. The amount of intersection between holes 124 and 140 depends on the radii of concave portion 178 and cylinder end 156.

The invention has been described with reference to the preferred embodiment, and further modifications and alterations may occur to others upon reading and understanding the specification. It is intended to include all such modifications and alterations insofar as they come within the scope of the invention.

Having thus defined the invention, it is claimed:

1. A method of replacing neck support assemblies at a station on a bottling maching for filling or capping containers having a generally circular cross-section to accommodate different size containers comprising:

providing a rotatable star wheel means for moving said containers through said machine;

providing said individual neck support assemblies about the periphery of said star wheel means including first and second neck support assemblies for each said station, each of said plurality of individual neck support assemblies having pocket support means for holding said containers and a star wheel support portion attached to said star wheel means;

providing piston means on each said neck support assembly for moving between a locked position and an unlocked position;

providing clamp pin means on said star wheel means for cooperating with said piston means;

depressing said piston means of said first neck support assembly and lifting said neck support assembly off of said star wheel means;

providing said second neck support assembly at said station and depressing said piston means;

lowering said second neck support assembly over said clamp pin means; and releasing said piston means whereby said piston means engages said clamp pin means to assume said locked position.

2. The method of claim 1, including providing positioning means on said star wheel means for engaging said neck support assemblies and aligning said second neck support assembly with said positioning means prior to said lowering step.

3. The method of claim 2, wherein said positioning means includes at least one stud for engaging with at least one mating hole on said neck support assembly.

4. A bottling machine for filling or capping containers having a generally circular cross-section comprising:

a rotatable star wheel means having a plurality of peripheral individual neck support assemblies for receiving and moving said containers through said machine;

each of said plurality of individual neck support assemblies including a pocket support means for holding said containers and a star wheel support portion attached to said star wheel means;

said star wheel support portion including snap locking means for releasably attaching each said neck support assembly to said star wheel means, said snap means for releasably attaching including a spring loaded piston cooperable with a hub clamp pin on said star wheel means, said hub clamp pin engaging said piston in an interference fit to maintain said neck support assembly on said star wheel means.

5. The bottling machine of claim 4, including positioning means on said star wheel means for engaging with said neck support assembly to align said neck support assembly in position.

6. The bottling machine of claim 5, wherein said positioning means includes at least one stud for engaging with at least one mating hole on said neck support assembly, said at least one stud in substantial registry with said at least one mating hole.

7. The bottling machine of claim 6, wherein said at least one stud has a threaded portion and a shank portion, said threaded portion engaging with a tapped hole in said star wheel means, said shank portion located within said at least one mating hole.

8. The bottling machine of claim 4, wherein said clamp pin includes a shank extending above said star wheel means, said shank including a concave portion for engaging with said spring loaded piston.

9. The bottling machine of claim 8, wherein said spring loaded piston includes a clamp pin engaging portion and a rod extending therefrom.

10. The bottling machine of claim 9, wherein said clamp pin engaging portion is a cylinder portion connected to said rod.

11. The bottling machine of claim 8, wherein said neck support assembly includes an opening within which said shank of said clamp pin is located.

12. The bottling machine of claim 11, wherein said neck support assembly includes a hole within which said piston is located.

13. The bottling machine of claim 12, wherein said opening for said shank is generally perpendicular to said hole.

14. The bottling machine of claim 13, wherein a tangent to the outside diameter of said hole passes through said opening for said shank.

15. The bottling machine of claim 12, wherein said opening and said hole intersect.

16. The bottling machine of claim 15, wherein said concave portion of said clamp pin intersects with said hole.

17. The bottling machine of claim 10, wherein said piston includes an extended position and depressed position, whereby said neck support assembly is removable from said star wheel means in said depressed position and is locked in position on said star wheel means in said extended position.

18. The bottling machine of claim 12, wherein said piston includes an extended position and depressed position, whereby said neck support assembly is removable from said star wheel means in said depressed position and is locked in position on said star wheel means in said extended position.

19. A bottling machine for filling or capping containers having a generally circular cross-section comprising:

a rotatable star wheel means having a plurality of peripheral individual neck support assemblies for receiving and moving said containers through said machine;

each of said plurality of individual neck support assemblies including a pocket support means for holding said containers and a star wheel support portion attached to said star wheel means;

said star wheel support portion including piston means on said neck support assembly cooperable with clamp pin means on said star wheel means for releasably attaching each said neck support assembly to said star wheel means.

20. The bottling machine of claim 19, wherein said piston means for releasably attaching includes a spring loaded piston cooperable with said clamp pin means.

21. The bottling machine of claim 19, including positioning means on said star wheel means for engaging with said neck support assembly to align said neck support assembly in position.

22. The bottling machine of claim 21, wherein said positioning means includes at least one stud for engaging with at least one mating hole on said neck support assembly, said at least one study in substantial registry with said at least one mating hole.

23. The bottling machine of claim 22, wherein said at least one stud has a threaded portion and a shank portion, said threaded portion engaging with a tapped hole in said star wheel means, said shank portion located within said at least one mating hole.

24. The bottling machine of claim 19, wherein said clamp pin means includes a clamp pin having a shank extending above said star wheel means, said shank including a concave portion for engaging with said piston means.

25. The bottling machine of claim 24, wherein said piston means includes a spring loaded piston which includes a clamp pin engaging portion and a rod extending therefrom.

26. The bottling machine of claim 25, wherein said clamp pin engaging portion is a cylinder connected to said rod.

27. The bottling machine of claim 24, wherein said neck support assembly includes an opening within which said shank of said clamp pin is located.

28. The bottling machine of claim 27, wherein said neck support assembly includes a hole within which said piston is located.

29. The bottling machine of claim 28, wherein said opening for said shank is generally perpendicular to said hole.

30. The bottling machine of claim 29, wherein a tangent to the outside diameter of said hole passes through said opening for said shank.

31. The bottling machine of claim 28, wherein said opening and said hole intersect.

32. The bottling machine of claim 31, wherein said concave portion of said clamp pin intersects with said hole.

33. The bottling machine of claim 26, wherein said piston includes an extended position and depressed position, said cylinder located in an interference fit within said concave portion in said extended position, said rod being adjacent said concave portion when said piston is in said depressed position, whereby said neck support assembly is removable from said star wheel means in said depressed position and is locked in position on said star wheel means in said extended position.

34. A bottling machine for filling or capping containers having a generally circular cross-section comprising:

a rotatable star wheel means having a plurality of peripheral individual neck support assemblies for receiving and moving said containers through said machine;

each of said plurality of individual neck support assemblies including a pocket support means for holding said containers and a star wheel support portion attached to said star wheel means;

said star wheel support portion including snap locking means for releasably attaching each said neck support assembly to said star wheel means said star wheel means including a plurality of studs extending therefrom and said support portion including means for mating with said studs.

35. The bottling machine of claim 34, wherein said studs include a threaded portion, said threaded portion placed in existing threaded holes in said star wheel means.

36. An improved connection for a neck support assembly on a bottling machine for filling or capping containers having a generally circular cross-section, said bottling machine including rotatable star wheel means having a plurality of peripheral individual neck support assemblies for receiving and moving said containers through said machine, each of said plurality of individual neck support assemblies including a pocket support means for holding said containers and a star wheel support portion attached to said star wheel means, the improvement comprising: said star wheel support portion including snap locking means for releasably attaching each said neck support assembly to said star wheel means, said snap means for releasably attaching including a spring loaded piston cooperable with a hub clamp pin on said star wheel means, said hub clamp pin engaging said piston to maintain said neck support assembly on said star wheel means in a locked position.

* * * * *